United States Patent
Shimohara et al.

(10) Patent No.: US 9,109,127 B2
(45) Date of Patent: Aug. 18, 2015

(54) INK COMPOSITION, IMAGE FORMING METHOD, AND PRINTED ARTICLE USING THE SAME

(71) Applicant: FUJIFILM CORPORATION, Tokyo (JP)

(72) Inventors: Norihide Shimohara, Kanagawa (JP); Ryoichi Nakano, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 187 days.

(21) Appl. No.: 13/747,164

(22) Filed: Jan. 22, 2013

(65) Prior Publication Data
US 2013/0208045 A1    Aug. 15, 2013

(30) Foreign Application Priority Data
Feb. 13, 2012  (JP) ................. 2012-028758

(51) Int. Cl.
  *B41J 2/01*       (2006.01)
  *C09D 11/30*      (2014.01)
  *B41J 2/21*       (2006.01)
  *C09D 11/107*     (2014.01)

(52) U.S. Cl.
  CPC ............... *C09D 11/30* (2013.01); *B41J 2/2107* (2013.01); *C09D 11/107* (2013.01)

(58) Field of Classification Search
  CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
  USPC .......... 347/100, 95, 96, 99, 88, 101, 102, 20, 347/9, 105, 103; 106/31.6, 31.13, 31.27; 523/160, 161
  See application file for complete search history.

(56) References Cited

U.S. PATENT DOCUMENTS 5,160,370 A *  11/1992  Suga et al. ............. 347/100
5,734,403 A *   3/1998  Suga et al. ............. 347/100
6,329,446 B1   12/2001  Sacripante et al.
7,172,276 B2 *  2/2007  Breton et al. ........... 347/100
7,625,958 B2 * 12/2009  Tanaka et al. ........... 106/31.13
7,868,058 B2 *  1/2011  Narita et al. ............ 523/160
2004/0132863 A1  7/2004  Narita et al.
2009/0023854 A1* 1/2009  Takizawa et al. ........ 524/502
2010/0178425 A1* 7/2010  Ooishi et al. ........... 427/256
2010/0277526 A1 11/2010  Chen et al.
2013/0038659 A1  2/2013  Kaneko et al.

FOREIGN PATENT DOCUMENTS

| EP | 0376284 A2    | 7/1990  |
| EP | 0588316 A2    | 3/1994  |
| EP | 2208764 A1    | 7/2010  |
| JP | H10-338826 A  | 12/1998 |
| JP | 2002-294122 A | 10/2002 |
| JP | 2004-203996 A | 7/2004  |
| JP | 2007-231180 A | 9/2007  |
| JP | 2010-013585 A | 1/2010  |
| JP | 2011-507991 A | 3/2011  |
| WO | 2011/136000 A1| 11/2011 |

OTHER PUBLICATIONS

The extended European search report issued on May 8, 2013, which corresponds to EP13154387.8 and is related to U.S. Appl. No. 13/747,164.
An Office Action; "Notice of Reasons for Rejection," issued by the Japanese Patent Office on Feb. 25, 2014, which corresponds to Japanese Patent Application No. 2012-028758 and is related to U.S. Appl. No. 13/747,164; with English language translation.
A Communication pursuant to Article 94(3) issued by the European Patent Office on Aug. 4, 2014, which corresponds to European Patent Application No. 13 154 387.8-1302 and is related to U.S. Appl. No. 13/747,164.
A Communication pursuant to Article 94(3) issued by the European Patent Office on Mar. 27, 2014, which corresponds to European Patent Application No. 13 154 387.8-1302 and is related to U.S. Appl. No. 13/747,164.
An Office Action; "Notice of Reasons for Rejection," issued by the Japanese Patent Office on Nov. 18, 2014, which corresponds to Japanese Patent Application No. 2012-028758 and is related to U.S. Appl. No. 13/747,164; with English language translation.

* cited by examiner

*Primary Examiner* — Manish S Shah
(74) *Attorney, Agent, or Firm* — Studebaker & Brackett PC

(57) ABSTRACT

Provided is an ink composition that can form an image in which bleeding caused when the image is recorded by an ink jet method is inhibited and which has excellent toughness and glossiness and shows excellent adhesiveness with respect to various substrates, even when being dried at a low temperature. The ink composition for an ink jet including (a) an alkyl(meth)acrylate copolymer which contains an alkyl (meth)acrylate having 7 to 22 carbon atoms in total and a repeating unit derived from (meth)acrylic acid and has an acid value of 1.3 mmol/g to 2.0 mmol/g in an unneutralized state, and (b) an aqueous medium containing water.

17 Claims, No Drawings

INK COMPOSITION, IMAGE FORMING METHOD, AND PRINTED ARTICLE USING THE SAME

BACKGROUND OF THE INVENTION

1. Field of the Invention

The present invention relates to an ink composition, an image forming method, and a printed article using the same.

2. Description of the Related Art

As image recording methods for forming an image on a recording medium such as paper based on image data signals, there are an electrophotographic method, sublimation- and fusion-type thermal transfer methods, an ink jet method, and the like. The electrophotographic method requires a process for forming an electrostatic latent image on a photosensitive drum by charging or exposure, so the system becomes complicated. As a result, the method has a problem of the increase in production cost and the like. In addition, though the device for the thermal transfer method is inexpensive, the method uses ink ribbons. Therefore, the method has problems that the running cost is high, waste materials are produced, and the like.

On the other hand, in the ink jet method, an inexpensive device is used, and an ink is discharged only to a necessary image portion to directly form an image on a recording medium. Accordingly, the method is advantageous in that the ink can be used efficiently and the running cost is low. Moreover, the method generates little noise and is excellent as an image recording method.

Among ink compositions used in image recording performed by the ink jet method, an aqueous ink using latex can be suitably used not only in image printing, but also in pretreatment for imparting printing suitability to a recording medium, post-treatment for protecting and decorating the printed image, and the like. Moreover, containing water as a main component, the aqueous ink is excellent in safety and is applicable to high-density ink jet recording due to its low viscosity. In this way, the aqueous ink using latex is a technique having various excellent characteristics and potential.

As an example of basic constituent materials of the aqueous ink containing latex, there is a disclosure regarding an ink composition that contains water, acrylic polymer latex having a particle size of about 200 nm, a water-soluble organic solvent, a pigment dispersion, and a surfactant and exhibits excellent ink resistance after drying or discharge properties (for example, see JP2011-507991A).

SUMMARY OF THE INVENTION

However, when being dried, the ink composition using latex exhibits insufficient viscosity increase, and bleeding of the printed article can be further improved. In addition, there is a problem that when the ink composition is dried at a low temperature, image strength or the glossiness of the formed image becomes insufficient.

An object of the present invention made in consideration of the above problems of the related art is to provide an ink composition that can form an image in which bleeding caused when the image is recorded by an ink jet method is inhibited and which has excellent toughness and glossiness and shows excellent adhesiveness with respect to various substrates, even when being dried at a low temperature.

In addition, another object of the present invention is to provide an image forming method which uses the ink composition of the present invention and can form an image having excellent toughness and glossiness and shows excellent adhesiveness with respect to various substrates, and to provide a printed article obtained by the ink composition or the image forming method of the present invention.

Specific means for achieving the above objects are as follows.

<1> An ink composition for an ink jet, containing (a) an alkyl(meth)acrylate copolymer that contains a repeating unit derived from an alkyl(meth)acrylate having 7 to 22 carbon atoms in total and a repeating unit derived from (meth)acrylic acid and has an acid value of 1.3 mmol/g to 2.0 mmol/g in an unneutralized state, and (b) an aqueous medium containing water.

The repeating unit derived from an alkyl(meth)acrylate having 7 to 22 carbon atoms in total is preferably a repeating unit derived from alkyl(meth)acrylate having 7 to 20 carbon atoms in total.

<2> The ink composition for an ink jet according to aspect <1>, wherein the (a) alkyl(meth)acrylate copolymer is a neutralized material in which at least a portion thereof has been neutralized and which has a neutralization degree of 40% to 100%.

<3> The ink composition for an ink jet according to aspect <1> or <2>, wherein an SP value of the (a) alkyl(meth)acrylate copolymer in an unneutralized state is 18.5 $\text{MPa}^{1/2}$ to 20.5 $\text{MPa}^{1/2}$.

<4> The ink composition for an ink jet according to any one of aspects <1> to <3>, wherein a proportion of the (a) alkyl(meth)acrylate copolymer added to the ink composition is 5% by mass to 15% by mass.

<5> The ink composition for an ink jet according to any one of aspects <1> to <4>, wherein the (a) alkyl(meth)acrylate copolymer is a copolymer that contains only a repeating unit derived from an alkyl(meth)acrylate having 7 to 20 carbon atoms in total and the repeating unit derived from (meth)acrylic acid as repeating units.

<6> The ink composition for an ink jet according to any one of aspects <1> to <5>, wherein the (a) alkyl(meth)acrylate copolymer is a copolymer that contains only a repeating unit derived from an alkyl methacrylate having 7 to 20 carbon atoms in total and a repeating unit derived from methacrylic acid as repeating units.

<7> The ink composition for an ink jet according to any one of aspects <1> to <6>, wherein the (b) aqueous medium containing water contains (c) a water-soluble organic solvent.

<8> The ink composition for an ink jet according to any one of aspects <1> to <7>, further containing (d) a colorant.

<9> An image forming method including an ink imparting step for imparting the ink composition according to any one of aspects <1> to <8> onto a recording medium.

<10> An image forming method including an ink-imparting step for imparting the ink composition according to any one of aspects <1> to <8> onto a recording medium, and an ink drying step for drying the ink composition imparted onto the recording medium to remove at least a portion of the (b) aqueous medium containing water that is contained in the ink composition.

<11> The image forming method according to aspect <10>, wherein the ink drying step is performed in an atmosphere at a temperature equal to or lower than 60° C.

<12> A printed article which is formed on an image recording medium by the ink composition according to any one of aspects <1> to <8> or by the image forming method according to any one of aspects <9> to <11>.

In the present specification, a range of numerical values described using "to" means a range including the numerical values described before and after "to" as a lower limit and an upper limit.

In addition, in the present specification, "(meth)acrylate" refers to either or both of acrylate and methacrylate, and "(meth)acryl" refers to either or both of acryl and methacryl.

In the present specification, the term "step" includes not only an independent step, but also a step that is not clearly distinguished from other steps as long as the step can achieve its desired action.

According to the present invention, an ink composition can be provided which can form an image in which bleeding caused when the image is formed by an ink jet method is inhibited and which has excellent toughness and glossiness and shows excellent adhesiveness with respect to various substrates even when being dried at a low temperature.

In addition, according to the present invention, an image forming method which can form an image having excellent toughness and glossiness and showing excellent adhesiveness with respect to various substrates, and a printed article which includes the image having excellent toughness and glossiness and showing excellent adhesiveness with respect to various substrates can be provided.

DESCRIPTION OF THE PREFERRED EMBODIMENTS

<Ink Composition for Ink jet>

The ink composition for an ink jet of the present invention is an aqueous ink composition containing (a) an alkyl(meth) acrylate copolymer (hereinafter, appropriately called (a) a specific copolymer) that contains a repeating unit derived from alkyl (meth)acrylate having 7 to 22 carbon atoms in total and a repeating unit derived from (meth)acrylic acid and has an acid value of 1.3 mmol/g to 2.0 mmol/g in an unneutralized state, and (b) an aqueous medium containing water.

The mechanism of action of the present invention is unclear, but the present inventors presume the mechanism is as follows.

Though the ink composition of the present invention contains the (a) specific copolymer, the (a) specific copolymer contains a hydrophilic repeating unit and a hydrophobic repeating unit in balance and has a specific acid value. Therefore, the copolymer present in the (b) aqueous medium containing water is in a dissolved state. However, when tiny ink composition drops dropped from an ink jet nozzle are dried on a substrate, the viscosity rapidly increases as the amount of the aqueous medium is reduced. Accordingly, it is considered that the ink composition drops do not easily mix with the adjacent ink drops dropped, so bleeding caused by mixing of ink drops is effectively inhibited. In addition, before the (b) aqueous medium that is contained in the ink composition and contains water and the (c) water-soluble organic solvent if desired are volatilized, and the amount thereof is reduced, the (a) specific copolymer dissolves in the ink composition. Accordingly, the ink composition imparts a dried film having a smoother surface to an image formed after drying of the (b) aqueous medium, compared to an ink composition containing fine resin particles such as latex. Accordingly, it is considered that the glossiness of the image becomes excellent. Moreover, the (a) specific copolymer according to the present invention has an appropriate acid value and contains a hydrophobic repeating unit. Therefore, it is considered that though the copolymer is present in the ink composition while being dissolved in the ink composition, that is, in a sufficient amount of the (b) aqueous medium, the hydrophobic segment hinders the ink composition from being dissolved in water in a coating film formed after drying, whereby water resistance is expressed, and accordingly, an image having excellent toughness is formed. Further, it is considered that since a curing reaction is not used in forming an image, little residual stress is caused on the formed image, or, there is no concern over the deterioration of adhesiveness caused by volumetric contraction accompanied by the curing reaction, whereby the image shows excellent adhesiveness with respect to a substrate.

<(a) alkyl(meth)acrylate copolymer that contains alkyl (meth)acrylate having 7 to 22 carbon atoms in total and repeating unit derived from (meth)acrylic acid and has acid value of 1.3 mmol/g to 2.0 mmol/g in unneutralized state>

The ink composition of the present invention contains at least an alkyl(meth)acrylate copolymer [(a) specific copolymer] that contains alkyl(meth)acrylate having 7 to 22 carbon atoms in total and a repeating unit derived from (meth)acrylic acid and has an acid value of 1.3 mmol/g to 2.0 mmol/g in an unneutralized state.

The (a) specific copolymer of the present invention is preferably a copolymer of which in practice 10% or more dissolves in the (b) aqueous medium contained in the ink composition. Herein, the (b) aqueous medium contains at least water, and, if desired, a (c) water-soluble organic solvent.

The "copolymer of which in practice 10% or more dissolves in the (b) aqueous medium" refers to a copolymer that does not cause particles having a volume average particle size of 10 nm or more to be observed when a solution, which is obtained by adding the (a) specific copolymer in an amount of 10% by mass to the (b) aqueous medium (25° C.) used in the ink composition and dissolving the copolymer, is measured in terms of particle size by a dynamic light scattering method.

The (a) specific copolymer used in the present invention is a copolymer that contains (a-1) alkyl(meth)acrylate having 7 to 22 carbon atoms and (a-2) a repeating unit derived from an (meth)acrylic acid as essential components. The (a) specific copolymer may further contain a copolymerization component including (a-3) any other ethylenically unsaturated monomer if desired.

[(a-2) Repeating Unit Derived from (meth)acrylic Acid]

The "(a-2) repeating unit derived from (meth)acrylic acid (hereinafter, called a repeating unit (a-2) appropriately)" used for the (a) specific copolymer according to the present invention is a repeating unit contained for the purpose of causing the (a) specific copolymer to express water solubility. The repeating unit derived from (meth)acrylic acid is a repeating unit derived from one or more kinds selected from acrylic acid, methacrylic acid, and neutralized materials of these. Herein, the "neutralized material" refers to a material obtained when a carboxy group in (meth)acrylic acid is neutralized by a base.

The acid value of the (a) specific copolymer that is determined by the amount of the introduced repeating unit (a-2) described later is from 1.3 mmol/g to 2.0 mmol/g, more preferably from 1.35 mmol/g to 1.95 mmol/g, and particularly preferably from 1.45 mmol/g to 1.95 mmol/g. If the acid value of the (a) specific copolymer is in the above range, the (a) specific copolymer is stably dissolved and present in the ink composition.

In addition, the acid value described herein is an acid value obtained when the (meth)acrylic acid in the (a) specific copolymer is in an unneutralized state, and indicates mol of a carboxy group per 1 g of the (a) specific copolymer. The acid value can be measured by potentiometric titration using a 0.1 mmol/L aqueous potassium hydroxide solution, by using, for example, an automatic titration instrument (for example, GT-100 manufactured by Mitsubishi Chemical Analytech Co., Ltd.)

In order to improve solubility of the (a) specific copolymer in the (b) aqueous medium, it is preferable that 40% to 100% of (meth)acrylic monomers constituting the repeating unit (a-2) be neutralized in the ink composition of the present invention. That is, the neutralization degree is preferably 40% to 100%, and it is more preferable that 45% to 90% of the (meth)acrylic acid constituting the repeating units (a-2) be neutralized. In other words, in view of solubility of the (a) specific copolymer, it is preferable that the repeating unit derived from (meth)acrylic acid and the repeating unit derived from a neutralized material of (meth)acrylic acid be contained in the copolymer as the repeating unit (a-2), and that the content of the repeating units derived from the neutralized material be in the above range.

Examples of methods of neutralizing the (a) specific copolymer containing (meth)acrylic acid by using a base includes a method of heating and stirring the (a) specific copolymer in an aqueous sodium hydroxide solution or an aqueous sodium hydrogen carbonate solution, a method of mixing and stirring the organic solvent solution of the (a) specific copolymer with an aqueous basic solution, a method of copolymerizing (meth)acrylic acid that has already been neutralized by a base with another monomer so as to obtain a neutralized material of the (a) specific copolymer, and the like. By controlling an equivalent ratio between the (meth) acrylic acid in the (a) specific copolymer and the base for neutralization, the neutralization degree can be controlled.

In addition, examples of the method of measuring a neutralization degree include a method of separating the (a) specific copolymer from the ink composition by a method such as reprecipitation, returning a neutral salt of a carboxylic acid thereof to a carboxylic acid by using a strong acid such as hydrochloric acid, then performing neutralization titration to measure the amount of the surplus strong acid and carboxylic acid.

The base used for neutralization is not particularly limited, and any of known inorganic and organic bases can be used.

As inorganic bases, bases providing an alkali metal salt or an alkaline earth metal salt are preferable, and particularly, an alkali metal salt is preferable. Examples of the inorganic bases providing an alkali metal salt include lithium hydroxide, sodium hydroxide, potassium hydroxide, lithium carbonate, sodium carbonate, potassium carbonate, sodium hydrogen carbonate, potassium hydrogen carbonate, and the like.

As organic bases, bases providing an ammonium salt are preferable, and examples thereof include ammonia, organic amines such as alkylamines, dialkylamines, and trialkylamines, quaternary ammonium hydroxides such as tetraalkylammonium hydroxide and trialkylbenzylammonium hydroxide, and the like.

The (a) specific copolymer may contain only one kind of the repeating unit (a-2) or two or more kinds thereof. When the copolymer contains two or more kinds of the repeating unit (a-2), a combination of (meth)acrylic acid and a neutralized material of (meth)acrylic acid is preferable.

The content of the repeating unit (a-2) contained in the (a) specific copolymer is preferably in a range in which the (a) specific copolymer has the above preferable acid value. More specifically, the content is preferably 9.3% by mass to 17.2% by mass, more preferably 10% by mass to 17% by mass, and particularly preferably 12% by mass to 17% by mass, based on the total repeating units contained in the (a) specific copolymer.

[(a-1) Alkyl (meth)acrylate Having 7 to 22 Carbon Atoms in Total]

The (a) specific copolymer according to the present invention contains, "(a-1) an alkyl(meth)acrylate having 7 to 22 carbon atoms in total (hereinafter, called a repeating unit (a-1) appropriately)" as an essential component.

The repeating unit (a-1) can be used without limitation, as long as this is alkyl (meth)acrylate having 7 to 22 carbon atoms in total, that is, "an alkyl ester of (meth)acrylate having 7 to 22 carbon atoms in total".

Among these, in view of improving solubility in an aqueous medium, the total number of carbon atoms is preferably 7 to 20, more preferably 7 to 16, and even more preferably 7 to 12. That is, in a case of alkyl acrylate, the repeating unit is an ester having an alkyl group having 4 to 19 carbon atoms, and preferably an ester having an alkyl group having 4 to 13 carbon atoms. In a case of alkyl methacrylate, the repeating unit is an ester having an alkyl group having 3 to 18 carbon atoms, and preferably an ester having an alkyl group having 4 to 18 carbon atoms.

The alkyl group may be linear or may have a branched chain.

Specific examples of the repeating unit (a-1) that can be contained in the (a) specific copolymer according to the present invention include n-propyl methacrylate, isopropyl methacrylate, n-butyl(meth)acrylate, isobutyl(meth)acrylate, tert-butyl(meth)acrylate, n-hexyl(meth)acrylate, 2-ethylhexyl(meth)acrylate, octyl(meth)acrylate, decyl(meth)acrylate, dodecyl(meth)acrylate, stearyl(meth)acrylate, and the like. Among these, in view of improving water solubility, n-propyl methacrylate, isopropyl methacrylate, n-butyl (meth)acrylate, isobutyl(meth)acrylate, tert-butyl(meth) acrylate, n-hexyl(meth)acrylate, 2-ethylhexyl(meth)acrylate, octyl(meth)acrylate, and the like are preferable. In addition, in view of improving water resistance, n-propyl methacrylate, isopropyl methacrylate, n-butyl methacrylate, isobutyl methacrylate, tert-butyl(meth)acrylate, n-hexyl methacrylate, and 2-ethylhexyl methacrylate are more preferable.

The (a) specific copolymer may contain only one kind of the repeating unit (a-1) or contains two or more kinds thereof.

The (a-1) alkyl(meth)acrylate having 7 to 22 carbon atoms in total is contained in the (a) specific copolymer in an amount of 40% by mass to 90.7% by mass, and more preferably 50% by mass to 90.7% by mass, in the respect that the polarity of the copolymer can be reduced with this amount.

According to purposes, the (a) specific copolymer according to the present invention may further contain (a-3) other repeating unit derived from an ethylenically unsaturated monomer that differs from the repeating unit (a-1) and the repeating unit (a-2) in terms of the structure, in addition to the (a-1) alkyl(meth)acrylate having 7 to 22 carbon atoms in total and the (a-2) repeating unit derived from (meth)acrylic acid, within a range that does not diminish the effects of the present invention.

Examples of monomers that are usable in the present invention and can constitute the (a-3) other repeating unit derived from an ethylenically unsaturated monomer include styrene monomers such as styrene and p-methoxystyrene; alkyl(meth)acrylates other than monomers constituting the repeating unit (a-1), such as methyl(meth)acrylate, ethyl (meth)acrylate, allyl(meth)acrylate, cyclohexyl(meth)acrylate, bornyl(meth)acrylate, and isobornyl(meth)acrylate; esters of (meth)acrylic acid other than alkyl(meth)acrylate, such as benzyl(meth)acrylate, 2-ethylhexyldiglycol(meth) acrylate, butoxyethyl(meth)acrylate, butoxymethyl(meth) acrylate, 3-methoxybutyl(meth)acrylate, 2-(2-methoxyethoxy)ethyl(meth)acrylate, 2-(2-ethoxyethoxy)ethyl(meth) acrylate, 2,2,2-trifluoroethyl(meth)acrylate, perfluorooctyl ethyl(meth)acrylate, 1H,1H,2H,2H-perfluorodecyl(meth) acrylate, 4-butylphenyl(meth)acrylate, phenyl(meth)acrylate, 2,4,5-trimethylphenyl(meth)acrylate, 4-chlorophenyl (meth)acrylate, phenoxymethyl(meth)acrylate, 2-phenoxyethyl(meth)acrylate, tetrahydroxyfurfuryl(meth)

acrylate, 2-hydroxyethyl(meth)acrylate, 3-hydroxypropyl (meth)acrylate, 2-hydroxypropyl(meth)acrylate, 2-hydroxybutyl(meth)acrylate, 4-hydroxybutyl(meth)acrylate, 3-hydroxypropyl(meth)acrylate, butoxydiethylene glycol (meth)acrylate, and 2-hydroxy-3-phenoxypropyl(meth)acrylate; acrylamides such as (meth)acrylamide, N-tert-butyl (meth)acrylamide, N-p-hydroxyphenyl(meth)acrylamide, p-sulfamoylphenyl(meth)acrylamide, and the like.

The (a-3) other repeating unit that can be contained in the (a) specific copolymer according to the present invention is preferably a repeating unit derived from a low-polarity monomer, in view of improving water resistance of the copolymer. For example, if the copolymer contains a repeating unit derived from a hydrophobic monomer such as alkyl(meth) acrylates other than styrenes or monomers constituting the repeating unit (a-1), the water resistance of a formed image is improved. On the other hand, if the copolymer contains a repeating unit derived from a high-polarity monomer such as (meth)acrylate having a hydroxyl group or acrylamides, the copolymer has an advantage that the solubility of the copolymer in an aqueous medium becomes excellent. In this way, the (a-3) other repeating unit may be used for imparting desired physical properties to the (a) specific copolymer, or may be used concurrently simply for adjusting a molecular weight and the like.

When the (a) specific copolymer according to the present invention contains the (a-3) other repeating unit, the content of the repeating unit preferably ranges from 0.1% by mass to 50.7% by mass, more preferably 30% by mass or less, and even more preferably 20% by mass or less.

That is, for the (a) specific copolymer according to the present invention, an embodiment in which the copolymer contains only the repeating unit (a-1) and the repeating unit (a-2) is most preferable. In the embodiment in which the (a) specific copolymer contains only the repeating unit (a-1) and the repeating unit (a-2), it is preferable that the copolymer contain a combination of 10% by mass to 17% by mass of (a-1) with 83% by mass to 90% by mass of (a-2).

A weight average molecular weight of the (a) specific copolymer contained in the ink composition of the present invention preferably ranges from 10,000 to 150,000, in view of water resistance. The weight average molecular weight more preferably ranges from 20,000 to 90,000, in view of improving discharge properties.

The weight average molecular weight is measured by Gel Permeation Chromatography (GPC). The weight average molecular weight was measured using HLC-8020GPC (manufactured by TOSOH CORPORATION), TSKgel SuperHZM-H, TSKgel SuperHZ4000, and TSKgel SuperHZ200 (manufactured by TOSOH CORPORATION, 4.6 mm ID×15 cm) as columns, and tetrahydrofuran (THF) as an eluent, by setting the temperature of a column oven to 40° C. For calculating the molecular weight, polystyrene standards were used.

Specific examples of the (a) specific copolymer usable in the present invention are shown below by describing the repeating unit contained in the (a) specific copolymer, the content thereof based on mass, and the weight average molecular weight thereof, but the present invention is not limited to these. In addition, "SP" represents an SP value of the copolymer, "AV" represents an acid value, and each of the values described was obtained by the measurement method described above.

[Chem. 1]

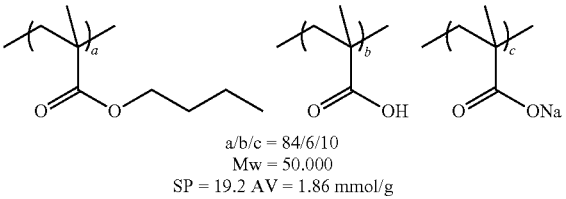

A-1 a/b/c = 84/6/10
Mw = 50.000
SP = 19.2 AV = 1.86 mmol/g

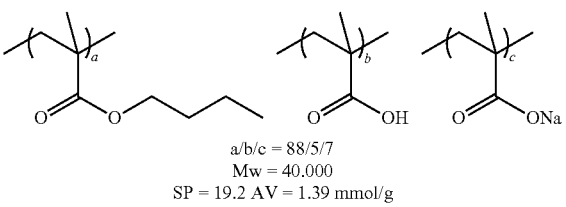

A-2 a/b/c = 88/5/7
Mw = 40.000
SP = 19.2 AV = 1.39 mmol/g

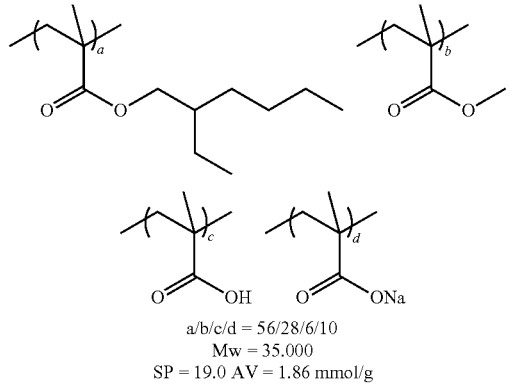

A-3 a/b/c/d = 56/28/6/10
Mw = 35.000
SP = 19.0 AV = 1.86 mmol/g

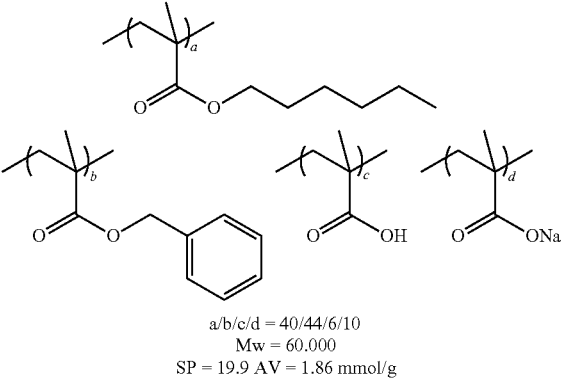

A-4 a/b/c/d = 40/44/6/10
Mw = 60.000
SP = 19.9 AV = 1.86 mmol/g

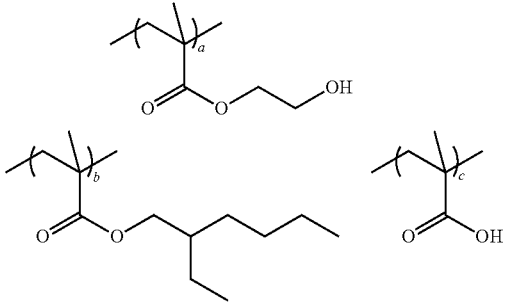

A-5

-continued

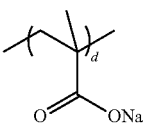

a/b/c/d = 30/54/6/10
Mw = 28.000
SP = 20.6 AV = 1.86 mmol/g

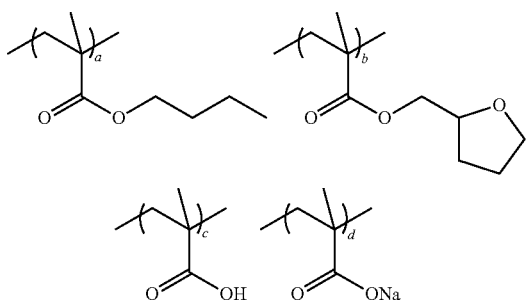

a/b/c/d = 45/39/6/10
Mw = 64.000
SP = 20.4 AV = 1.86 mmol/g

[Chem. 2]

A-7

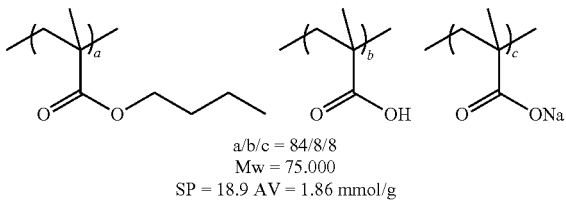

a/b/c = 84/8/8
Mw = 75.000
SP = 18.9 AV = 1.86 mmol/g

A-8

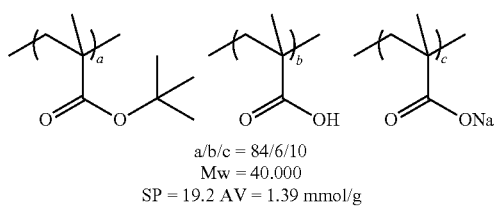

a/b/c = 84/6/10
Mw = 40.000
SP = 19.2 AV = 1.39 mmol/g

A-9

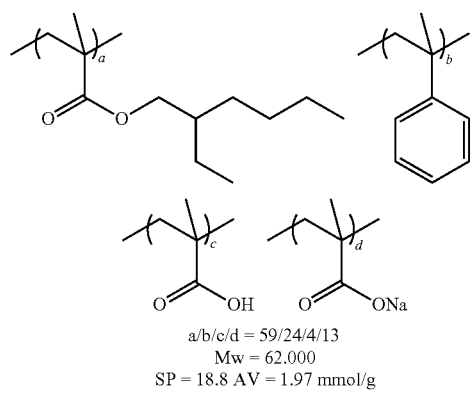

a/b/c/d = 59/24/4/13
Mw = 62.000
SP = 18.8 AV = 1.97 mmol/g

A-10

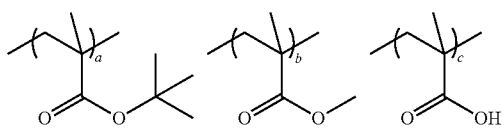

-continued

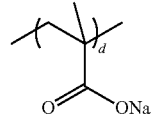

a/b/c/d = 60/26/4/10
Mw = 30.000
SP = 19.1 AV = 1.94 mmol/g

A-11

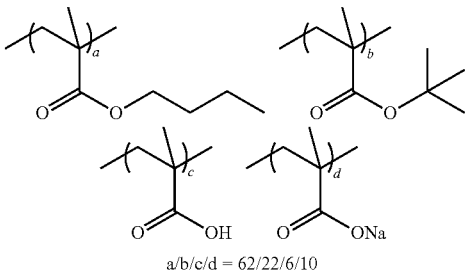

a/b/c/d = 62/22/6/10
Mw = 43.000
SP = 19.2 AV = 1.86 mmol/g

The (a) specific copolymer can be synthesized by known polymerization methods, and among these, radical polymerization is preferable since this method is excellent for application to various monomers. The method of radical polymerization is not particularly limited, and solution polymerization as well as suspension polymerization, dispersion polymerization, and the like can be used. For example, the copolymer can be synthesized based on the method described in JP2006-83232A. Examples of the method of neutralizing the (a) specific copolymer include a method of mixing and stirring the (a) specific copolymer with a basic aqueous medium to dissolve the copolymer, a method of mixing and stirring a water-soluble organic solvent solution of the (a) specific copolymer with a basic aqueous medium, a method of mixing a non-aqueous organic solvent solution of the (a) specific copolymer with a basic aqueous medium and removing the non-aqueous organic solvent by volatilizing the solvent to obtain the (a) specific copolymer, a method of polymerizing a neutralized material of (meth)acrylic acid with another monomer, and the like.

The content of the (a) specific copolymer in the ink composition of the present invention is preferably 5% by mass to 15% by mass, more preferably 5% by mass to 12% by mass, and most preferably 7% by mass to 12% by mass, based on the total amount of the ink composition. If the content is in the above range, both the discharge properties of an ink jet and bleeding tend to become excellent.

The SP value of the (a) specific copolymer according to the present invention is preferably 18.5 $MPa^{1/2}$ to 20.5 $MPa^{1/2}$, more preferably 18.8 $MPa^{1/2}$ to 20.3 $MPa^{1/2}$, and particularly preferably 18.9 $MPa^{1/2}$ to 20.1 $MPa^{1/2}$. The SP value described in the present invention is a solubility parameter calculated by Okitsu's method (Adhesives, Vol. 38, No. 6, p. 6 (1994), Kobunshi Kankokai), and indicates an estimated value that is obtained by providing a molar attraction constant and a molar volume per unit in a molecular structure proposed by Okitsu. In addition, in calculating the SP value of a polymer, the SP value is calculated in a state where a carboxylic acid in (meth)acrylic acid is unneutralized.

<(b) Aqueous Medium Containing Water>

The (b) aqueous medium according to the present invention contains water as a main component. In addition, in the present invention, the "aqueous medium" has a meaning including a solvent and a dispersion medium.

As water, deionized water, distilled water, and the like not containing impurities are preferably used.

The content of water in the ink composition of the present invention is preferably 10% by mass to 97% by mass, more preferably 30% by mass to 95% by mass, and even more preferably 35% by mass to 93% by mass.

((c) Water-Soluble Organic Solvent)

According to purposes, the (b) aqueous medium containing water may contain (c) a water-soluble organic solvent.

Herein, the water-soluble organic solvent refers to an organic solvent of which solubility in water at 25° C. is 10% by mass or higher.

Preferable examples of the (c) water-soluble organic solvent usable in the present invention include alcohol-based solvents, ketone-based solvents, and ether-based solvents.

Examples of the water-soluble organic solvent usable in the present invention include the following.

Alcohols (for example, isopropanol, butanol, isobutanol, sec-butanol, tert-butanol, pentanol, hexanol, cyclohexanol, and benzyl alcohol), Polyols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methylpropanediol), Polyol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), Amides (for example formamide, N,N-dimethylformamide, N,N-dimethylacetamide, and N,N-dimethyl), Heterocyclic compounds (for example, 2-pyrrolidone, N-methyl-2-pyrrolidone, N-ethyl-2-pyrrolidone, cyclohexyl pyrrolidone, 2-oxazolidone, 1,3-dimethyl-2-imidazolidinone, and γ-butyrolactone), Sulfoxides (for example, dimethylsulfoxide), Sulfones (for example, sulfolane), and Others (urea, acetonitrile, acetone, and the like)

Among the above water-soluble organic solvents, preferable examples include polyol ethers and heterocycles, and it is preferable to use these concurrently. Among polyol ethers, so-called glycol ethers are preferable, and specifically, tripropylene glycol monomethyl ether, dipropylene glycol monomethyl ether, and dipropylene glycol dimethyl ether are preferable, and 2-dipropylene glycol monomethyl ether is more preferable. As the heterocyclic compounds, 2-pyrrolidone, γ-butyrolactone, and the like are preferable, and 2-pyrrolidone is particularly preferable. Particularly, solvents having a high boiling point are preferably used, and among these, a solvent having a boiling point of 120° C. or higher under normal pressure is preferable, and a solvent having a boiling point of 150° C. or higher is more preferable.

The water-soluble organic solvents may be used alone, or a combination of a plurality of the solvents may be used.

When the water-soluble organic solvent is added to the (b) aqueous medium in the ink composition, the proportion of the solvent added is preferably 1% by mass to 60% by mass and more preferably 2% by mass to 35% by mass in terms of the total amount.

In addition, the type and content of the water-soluble organic solvent are preferably selected based on the correlation between the solvent and the (a) specific copolymer. In view of improving solubility of the (a) specific copolymer in the aqueous medium or adhesiveness with respect to a non-permeable support such as a vinyl chloride sheet, it is preferable to use a heterocyclic compound such as 2-pyrrolidone, N-methylpyrrolidone, or γ-butyrolactone or amides. The use of a heterocyclic compound or amides improves solubility of the (a) specific copolymer in the aqueous medium. However, it is considered that after drying, the dissolution effect produced from these organic solvents is eliminated, so water resistance is expressed. The content of these solvents in the ink composition is preferably 5% by mass to 30% by mass and more preferably 5% by mass to 20% by mass.

When the SP value of the (a) specific copolymer is in a range of 18.5 to 20.0, in view of improving discharge properties, it is preferable to use polyol ethers having a propylene glycol unit, such as dipropylene glycol monoethyl ether, dipropylene glycol dipropylene glycol, dipropylene glycol monobutyl ether, propylene glycol monobutyl ether, propylene glycol monopropyl ether, and tripropylene glycol monomethyl ether, or polyols having 4 or more carbon atoms, such as 1,2-hexanediol or 2-methyl-1,3-propanediol. When the SP value of the (a) specific copolymer is 20.0 to 20.5, it is preferable to use polyol ethers having an ethylene glycol or propylene glycol unit or polyols. The content of these in the ink composition is preferably 5% by mass to 20% by mass and more preferably 5% by mass to 15% by mass.

It is also preferable to use plural kinds of water-soluble organic solvents as the water-soluble organic solvent. For example, in order to obtain the above effects, it is preferable to use the heterocyclic compound or amides concurrently with the polyol ethers or polyols. When the heterocyclic compound or amides are used concurrently with the polyol ethers or polyols, the content thereof in the ink composition is preferably 10% by mass to 40% by mass and more preferably 10% by mass to 35% by mass, in terms of the total amount of the water-soluble organic solvent.

<(d) Colorant>

The ink composition of the present invention may contain (d) a colorant. By containing the (d) colorant, the ink composition of the present invention becomes a coloring ink composition.

The colorant usable in the present invention is not particularly limited, and can be used by being arbitrarily selected from known colorants such as pigments, water-soluble dyes, and dispersed dyes. Among these, the ink composition more preferably contains one or more kinds selected from pigments and water-soluble dyes as colorants.

(Pigment)

The pigment is not particularly limited and can be appropriately selected according to purposes. Examples of the pigment include known organic and inorganic pigments, resin particles stained with dyes, commercially available dispersed pigments, and pigments having undergone surface treatment (for example, those obtained by dispersing pigments in water, a liquid organic compound, an insoluble resin, or the like as a dispersion medium, and pigments having undergone surface treatment by using a resin, a pigment derivative, or the like). Examples of the pigment also include those described in "Pigment Dictionary", Seishiro Ito (2000, Asakura Publishing Co., Ltd.), "Organic Pigment Handbook", Isao Hashimoto (2006, Color Office), "Industrial Organic Pigments", W. Herbst, K. Hunger (1992, Wiley-VHC), JP2002-12607A, JP2002-188025A, JP2003-26978A, JP2003-342503A, and JP2009-235370A.

Examples of the organic pigments include a yellow pigment, a magenta pigment, a cyan pigment, a green pigment, an orange pigment, a brown pigment, a violet pigment, a black pigment, a white pigment, and the like.

The yellow pigment is a pigment having yellow hue, and examples thereof include monoazo pigments, diazo pigments, non-benzidine-based pigments, azo lake pigments, condensed azo pigments, acidic dye lake pigments, basic dye lake pigments, anthraquinone pigments, quinophthalone pigments, pyrazolone pigments, acetolone pigments, metal complex salt pigments, nitroso pigments, metal complex azomethine pigments, benzimidazolone pigments, isoindoline pigments, and the like. Among these, as pigments that can be preferably used in the present invention, C. I. Pigment Yellow (hereinafter, abbreviated to PY)1, PY3, PY12, PY13, PY14, PY16, PY17, PY18, PY24, PY60, PY74, PY83, PY93, PY94, PY95, PY97, PY100, PY109, PY110, PY115, PY117, PY120, PY128, PY138, PY139, PY150, PY151, PY153, PY154, PY155, PY166, PY167, PY173, PY175, PY180, PY181, PY185, PY194, PY213, PY214, PY219, and the like are exemplified. Among these, monoazo pigments, disazo pigments, benzimidazolone pigments such as acetolone pigments, and isoindoline pigments are preferable, and isoindoline pigments are most preferable.

The magenta pigment is a dye having red or magenta hue, and examples thereof include monoazo-based pigments, β-naphthol pigments, disazo pigments, azo lake pigments, condensed azo pigments, acidic dye lake pigments, basic dye lake pigments, anthraquinone pigments, thioindigo pigments, perinone pigments, perylene pigments, quinacridone pigments, isoindolinone pigments, alizarin lake pigments, naphtholone pigments, naphthol AS-based pigments, naphthol AS pigments, diketopyrrolopyrrole pigments, and the like.

Among these, as pigments that can be preferably used in the present invention, C. I. Pigment Red (hereinafter, abbreviated to PR)1, PR2, PR3, PR4, PR5, PR6, PR21, PR38, PR42, PR46, PR53:1, PR57:1, PR52:1, PR48, PR81, PR83, PR88, PR144, PR149, PR166, PR179, PR178, PR190, PR224, PR123, PR19, PR122, PR202, PR207, PR209, PR180, PR83, PR170, PR171, PR172, PR174, PR175, PR176, PR177, PR179, PR185, PR194, PR208, PR214, PR220, PR221, PR242, PR247, PR254, PR255, PR256, PR262, PR268, PR264, PR269, PR272, PR282, C. I. Pigment Violet 19, and the like are exemplified. Among these, quinacridone pigments are preferable, unsubstituted quinacridone, dimethyl quinacridone, and dichloroquinacridone such as PR42, PR122, PR202, PR209, PR282, and C. I. Pigment Violet (hereinafter, abbreviated to PV) 19, and crystals of these are preferable.

The cyan pigment is a pigment having cyan hue, and examples thereof include disazo pigments, phthalocyanine pigments, acidic dye lake pigments, basic dye lake pigments, anthraquinone-based pigments, alkali blue pigment, and the like. As pigments that can be preferably used in the present invention, C. I. Pigment Blue (hereinafter, abbreviated to PB)1, PB15, PB15:1, PB15:2, PB15:3, PB15:4, PB15:6, PB16, PB18, PB24, PB25, PB60, PB79, and the like are exemplified. Among these, copper phthalocyanine pigments are preferable, and PB15, PB15:1, PB15:2, PB15:3, PB15:4, and PB15:6 are preferable.

The green pigment is a pigment having green hue, and examples thereof include phthalocyanine pigments, metal complex pigments, and the like. As pigments that can be preferably used in the present invention, C. I. Pigment Green (hereinafter, abbreviated to PG)7, PG8, PG10, PG36, and the like are exemplified.

The orange pigment is a pigment having orange hue, and examples thereof include isoindoline pigments, anthraquinone pigments, B-naphthol pigments, naphthol AS pigments, isoindolinone pigments, perinone pigments, disazo pigments, quinacridone pigments, acetolone pigments, pyrazolone pigments, and the like. As pigments that can be preferably used in the present invention, C. I. Pigment Orange (hereinafter, abbreviated to PO)2, PO3, PO4, PO5, PO13, PO15, PO16, PO22, PO24, PO34, PO36, PO38, PO43, PO48, PO49, PO51, PO55, PO60, PO61, PO62, PO64, PO66, PO72, PO74, and the like are exemplified. Among these, isoindoline pigments are preferable.

The brown pigment is a pigment having brown hue, and examples thereof include naphtholone pigments such as PBr25 and PBr32.

The violet pigment is a pigment having violet hue, and examples thereof include naphtholone pigments, perylene pigments, naphthol AS pigments, dioxazine pigments, and the like. As pigments that can be preferably used in the present invention, C. I. Pigment Violet (hereinafter, abbreviated to PV)13, PV17, PV23, PV29, PV32, PV37, PV50, and the like are exemplified.

The black pigment is a pigment having black hue, and examples thereof include carbon black, indazine pigments, perylene pigments, and the like. In the present invention, C. I. Pigment Black (hereinafter, abbreviated to PBk)1, PBk7, PBk31, PBk32, and the like are exemplified.

Among these, PB15:3, 15:4, 15:6, PR122, PV19, quinacridone pigments of a solid solution containing these, PY74, 139, 120, 150, 151, 154, 180, 185, PBk7, and the like are preferable, in view of chromogenic properties and lightfastness.

As the white pigment, zinc oxide as C. I. Pigment White 4, titanium oxide as C. I. Pigment White 6, titanium sulfide as C. I. Pigment White 7, zirconium oxide (zirconium white) as C. I. Pigment White 12, calcium carbonate as C. I. Pigment White 18, aluminum oxide/silicon oxide (kaolin clay) as C. I. Pigment White 19, barium sulfate as C. I. Pigment White 21 or 22, ammonium hydroxide (alumina white) as C. I. Pigment White 23, silicon oxide as C. I. Pigment White 27, and calcium silicate as C. I. Pigment White 28 are preferable.

The inorganic particles used for the white pigment may be used alone, or used as complex particles with oxides of silicon, aluminum, zirconium, titanium and the like, an organic metal compound, and an organic compound.

Among these, the titanium oxide is preferably used. Moreover, in addition to the titanium oxide, another white pigment (which may be pigment other than the white pigments described above) may be used concurrently.

It is preferable to select pigments, dispersants, and media, and to set dispersion conditions and filtration conditions, such that the volume average particle size of the pigment particles becomes preferably 0.005 μm to 0.5 μm, more preferably 0.01 μm to 0.45 μm, and even more preferably 0.015 μm to 0.4 μm. In addition, in the present invention, the average particle size and particle size distribution are obtained by measuring a volume average particle size by a dynamic light scattering method using a commercially available particle size analyzer such as a Nanotrac particle size distribution analyzer UPA-EX150 (manufactured by NIKKISO CO., LTD.).

(Dispersant)

When a pigment is used as a colorant, a pigment dispersant may be used if necessary in preparing pigment particles. Examples of the usable pigment dispersant include activators such as higher fatty acid salts, alkyl sulfate, alkyl ester sulfate, alkyl sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, and amine oxide; block copolymers and random copolymers including two or more kinds of monomers selected from styrene, a styrene derivative, a vinyl naphthalene derivative, acrylic acid, an acrylic acid derivative, maleic acid, a maleic acid derivative, itaconic acid, an itaconic acid derivative, fumaric acid, and a fumaric acid derivative; and salts of these.

In addition, for the ink composition of the present invention, a self-dispersing pigment can also be used as a colorant. The self-dispersing pigment described in the present invention refers to a pigment that can disperse without a dispersant, and is particularly preferably pigment particles having a polar group on the surface thereof.

In the present invention, the pigment particles having a polar group on the surface thereof refer to pigment particles of which the surface is directly modified with a polar group, or an organic substance that has an organic pigment core and is bonded to a polar group directly or via a linkage (hereinafter, called a pigment derivative).

Examples of the polar group include a sulfonic acid group, a carboxylic acid group, a phosphoric acid group, a boric acid group, and a hydroxyl group. Among these, a sulfonic acid group and a carboxylic acid group are preferable, and a sulfonic acid group is more preferable.

As a method of obtaining such pigment particles having a polar group on the surface thereof, the method of oxidizing the surface of pigment particles by using an appropriate oxidant so as to introduce a polar group such as a sulfonic acid group or a salt thereof into at least a portion of the pigment surface, which is described in WO97-48769A, JP1998-110129A (JP-H10-110129A), JP1999-246807A (JP-H11-246807A), JP1999-57458A (JP-H11-57458A), JP1999-189739A (JP-H11-189739A), JP1999-323232A (JP-H11-323232A), JP2000-265094A, and the like, is exemplified. Specifically, the pigment particles can be prepared by oxidizing carbon black by using concentrated nitric acid, or, in a case of color pigment, by oxidizing pigment particles by using sulfamic acid, a sulfonated pyridine salt, or amidosulfuric acid in sulfolane or N-methyl-2-pyrrolidone. Pigment particles that are oxidized too much by those reactions and become water-soluble are removed and purified, whereby a pigment dispersion can be obtained. In addition, when a sulfonic acid group is introduced into the surface by oxidation, the acidic group may be neutralized using a basic compound if necessary.

As another method of obtaining the pigment particles having a polar group on the surface thereof, the method of causing a pigment derivative to be adsorbed onto the surface of pigment particles by treatment such as milling, which is described in JP1999-49974A (JP-H11-49974A), JP2000-273383A, JP2000-303014A, the method of dissolving a pigment along with a pigment derivative in a solvent and then crystallizing the resultant in a poor solvent, which is described in JP2000-377068, JP2001-1495, and JP2001-234966, and the like, are exemplified. The pigment particles having a polar group on the surface thereof can be easily obtained by any of the methods.

The polar group in the pigment surface may be in a free state or a salt state, or may have a counter salt. Examples of the counter salt include inorganic salts (lithium, sodium, potassium, magnesium, calcium, aluminum, nickel, and ammonium) and organic salts (triethyl ammonium, diethyl ammonium, pyridinium, triethanol ammonium, and the like). Among these, monovalent counter salts are preferable.

As method of dispersing a pigment, various dispersion machines such as a ball mill, a sand mill, an attritor, a roll mill, an agitator, a Henschel mixer, a colloid mill, an ultrasonic homogenizer, a pearl mill, a wet-type jet mill, and a painter shaker can be used. In addition, in order to remove coarse particles of the pigment dispersion, it is preferable to use a centrifugation instrument and a filter.

When the mass of a pigment in the ink composition is P, and the mass of a polymer dispersant in the ink composition is D, the amount of the dispersant added to the ink composition is preferably $0.01 \leq D/P \leq 2.0$, more preferably $0.03 \leq D/P \leq 1.5$, and even more preferably $0.05 \leq D/P \leq 0.6$, in terms of the mass ratio (D/P).

Moreover, during dispersion, it is preferable to add a dispersion aid generally called a synergist (for example, SOLSPERSE 5000, 12000, and 22000 commercially available from The Lubrizol Corporation, Japan, EFKA6745 commercially available from BASF, Japan, or the like), various surfactants, or an antifoaming agent, in addition to the dispersant, so as to improve dispersibility and wettability of a pigment.

In the present invention, when a pigment is dispersed, it is preferable that a pigment and a dispersant be mixed together and then added to an organic polar solvent so as to be dispersed. Alternatively, it is preferable that an organic polar solvent and a dispersant be mixed together, and then a pigment be added thereto for dispersion. For dispersion, for example, various dispersion instruments such as a ball mill, a beads mill, a sand mill, a salt mill, an attritor, a roll mill, an agitator, a Henschel mixer, a colloid mill, an ultrasonic homogenizer, a pearl mill, a wet-type jet mill, and a paint shaker can be used. Among these, the dispersion instrument of a beads mill is preferable since it shows excellent dispersibility.

When dispersion is performed using a beads mill, the volume average particle size of the beads used is preferably 0.01 mm to 3.0 mm, more preferably 0.05 mm to 1.5 mm, and even more preferably 0.1 mm to 1.0 mm. If such beads are used, a pigment dispersion having excellent stability can be obtained.

(Water-Soluble Dye)

For the ink composition of the present invention, a water-soluble dye may be used as the (d) colorant. Examples of water-soluble dyes usable in the present invention include acidic dyes and direct dyes. The acidic dyes and direct dyes have a structure having an acidic group as a solubilizing group. Examples of the acidic group include a sulfonic acid group and a salt thereof, a carboxylic acid group and a salt thereof, and a phosphoric acid group and a salt thereof. The water-soluble dye has one acidic group, plural acidic groups, or combined acidic groups. Examples of chemical structures of chromophores contained in the water-soluble dye include structures based on azo, phthalocyanine, triphenylmethane, xanthene, pyrazolone, nitro, stilbene, quinoline, methine, thiazole, quinonimine, indigoid, rhodamine, anthraquinone, and the like.

Specific examples of preferable oil-soluble dyes include, but are not limited to, C. I. Acid Yellow 19, C. I. Acid Red 37, C. I. Acid Blue 62, C. I. Acid Orange 10, C. I. Acid Blue 83, C. I. Acid Black 01, C. I. Direct Yellow 44, C. I. Direct Yellow 142, C. I. Direct Yellow 12, C. I. Direct Blue 15, C. I. Direct Blue 25, C. I. Direct Blue 249, C. I. Direct Red 81, C. I. Direct Red 9, C. I. Direct Red 31, C. I. Direct Black 154, C. I. Direct Black 17, and the like.

(Dispersed Dye)

For the ink composition of the present invention, a dispersed dye can also be used as the (d) colorant.

Specific examples of preferable dispersed dyes include C. I. Disperse Yellow 5, 42, 54, 64, 79, 82, 83, 93, 99, 100, 119, 122, 124, 126, 160, 184:1, 186, 198, 199, 201, 204, 224, and 237; C. I. Disperse Orange 13, 29, 31:1, 33, 49, 54, 55, 66, 73, 118, 119, and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; C. I. Disperse Green 6:1 and 9, and the like.

One kind of the colorant usable in the present invention may be used, or two or more kinds thereof may be used concurrently.

When the (d) colorant is used for the ink composition, the content of the colorant can be appropriately selected according to physical properties (specific gravity, coloring power, or tone) of coloring materials or the condition under which the colors of ink composition are combined to prepare a printed article. However, the content is preferably 0.1% by mass to 30% by mass, and more preferably 0.5% by mass to 20% by mass, based on the total mass of the ink composition.

<Other Additives>

For the ink composition of the present invention, known additives can be concurrently used, in addition to the (a) specific copolymer and (b) aqueous medium containing water as essential components as well as the (c) water-soluble organic solvent and (d) colorant as preferable components used concurrently, as long as the effects of the present invention are not diminished.

Hereinafter, the additives usable for the ink composition will be described.

(Surfactant)

A surfactant can be added to the ink composition of the present invention. Examples of surfactants that can be preferably used include anionic surfactants such as dialkyl sulfosuccinates, alkyl naphthalene sulfonates, and fatty acids; nonionic surfactants such as polyoxyethylene alkyl ethers, polyoxyethylene alkyl allyl ethers, acetylene glycols, and polyoxyethylene-polyoxypropylene block copolymers; and cationic surfactants such as alkylamines and quaternary ammonium salts. Particularly, anionic and nonionic surfactants can be preferably used.

In addition, in the present invention, polymer surfactants can also be used, and the following water-soluble resins are exemplified as preferable polymer surfactants. Examples of water-soluble resins preferably used include a styrene-acrylic acid-acrylic acid alkyl ester copolymer, a styrene-acrylic acid copolymer, a styrene-maleic acid-acrylic acid alkyl ester copolymer, a styrene-maleic acid copolymer, a styrene-methacrylic acid-acrylic acid alkyl ester copolymer, a styrene-methacrylic acid copolymer, a styrene-maleic acid half ester copolymer, a vinyl naphthalene-acrylic acid copolymer, a vinyl naphthalene-maleic acid copolymer and the like.

In order to improve discharge suitability and the like, the ink composition of the present invention can also use a fluorosurfactant having an alkyl fluoride group. If the ink composition contains a fluorosurfactant, improvement of discharge properties and adhesiveness with respect to a recording medium can be expected. Examples of the fluorosurfactant include the surfactants described in JP2002-277862A and the like, and the following commercially available surfactants can be used as they are.

Examples of commercially available surfactants that can be used include fluorosurfactants such as ZONYL FSN (fluorosurfactant manufactured by Sigma-Aldrich Co., LLC.), Megaface F171, F173, F176, F189, and R08 (manufactured by DIC Corporation), and SurfIon S-382, SC101, 102, 103, 104, 105, and 106 (manufactured by Asahi Glass Co., Ltd.).

For the ink composition according to the present invention, according to purposes of improving discharge stability, print head or ink cartridge suitability, storage stability, image storage properties, and various other performances, various known additives, for example, a viscosity adjustor, a surface tension adjustor, a specific resistance adjustor, a film forming agent, a dispersant, a surfactant, an ultraviolet absorber, an antioxidant, a fading inhibitor, an antifungal agent, an anticorrosive agent, a solid moisturizer, and fine silica particles can be appropriately selected and used if necessary, in addition to the respective constituent elements described above. Examples of the additives include fine particles of oil droplets such as liquid paraffin, dioctyl phthalate, tricresyl phosphate, and silicon oil; the ultraviolet absorbers described in JP1982-74193A (JP-S57-74193A), JP1982-87988A (JP-S57-87988A), JP1987-261476A (JP-S62-261476A), and the like; the fading inhibitors described in JP1982-74192A (JP-S57-74192A), JP1982-87989A (JP-S57-87989A), JP1985-72785A (JP-S60-72785A), JP1986-146591A (JP-S61-146591A), JP1989-95091A (JP-H01-95091A), JP-1991-13376A (JP-H03-13376A), and the like; the fluorescent whitening agents described in JP1984-42993A (JP-S59-42993A), JP1984-52689A (JP-S59-52689A), JP1987-280069A (JP-S62-280069A), JP1986-242871A (JP-S61-242871A), JP1992-219266A (JP-H04-219266A), and the like; pH adjustors such as sulfuric acid, phosphoric acid, citric acid, sodium hydroxide, potassium hydroxide, and potassium carbonate; and the like.

<Method of Preparing Ink Composition>

Methods of preparing the ink composition according to the present invention are not particularly limited. The ink composition can be prepared by stirring, mixing, and dispersing the respective components with a container-driven medium mill such as a ball mill, a centrifugal mill, or a planet ball mill, a high-speed rotation mill such as a sand mill, a medium stirring mill such as a stirring vessel-type mill, or a simple dispersing machine such as a disperser. The respective components are added in any order. Preferably, after an azo pigment, a polymer dispersant, and an organic solvent are premixed, dispersing treatment is performed, and the obtained dispersion is mixed with a resin and an organic solvent. In this case, at the time of adding the components, or after adding the components, the mixture is evenly mixed using a simple stirrer such as a three-one motor, a magnetic stirrer, a disperser, or a homogenizer. The components may be mixed using a mixer such as a line mixer. Moreover, in order to make the dispersed particles be finer, the components may be mixed using a dispersing machine such as a beads mill or a high-pressure spray mill. In addition, depending on the type of the pigment or polymer dispersant, a resin may be added at the time of pre-mixing before the pigment is dispersed.

Further, after the ink composition is prepared, it is preferable to remove coarse particles and the like, which cause a concern over deterioration of discharge properties, by filtering.

The surface tension at 25° C. of the ink composition of the present invention is preferably 20 mN/m to 40 mN/m. The surface tension is measured using Automatic Surface Tensiometer CBVP-Z (manufactured by Kyowa Interface Science Co., LTD.) under the condition of 25° C.

In addition, the viscosity of the ink composition is preferably 3 mPa·s to 40 mPa·s, and more preferably 6 mPa·s to 20 mPa·s. The viscosity of the ink composition is measured using VISCOMETER TV-22 (manufactured by TOKI SANGYO CO., LTD.) under the condition of 25° C.

<Image Forming Method>

The image forming method of the present invention is characterized by including an ink imparting step for imparting the ink composition on a recording medium. Moreover, after the ink imparting step, the ink composition is left as is such that the (b) aqueous medium in the ink composition is dried, the amount thereof is reduced, and the (a) specific copolymer is precipitated, whereby an image formed of the ink composition fixed onto the recording medium is formed. However, after the ink imparting step, if an ink drying step for drying the ink composition imparted onto the recording medium so as to remove at least a portion of the (b) aqueous medium containing water contained in the ink composition is performed, an image showing excellent glossiness, durability, and adhesiveness with respect to the recording medium is more rapidly obtained. Since the ink composition of the present invention uses the (a) specific copolymer, an image having excellent adhesiveness is rapidly formed by the ink drying step under an atmosphere at a temperature equal to or lower than 70° C., that is, without being subjected to high-temperature drying that is generally performed at a temperature exceeding 80° C.

(Ink Imparting Step)

Hereinafter, the ink imparting step in the image forming method of the present invention will be described. In the present invention, the ink imparting step is not limited as long as the step is a step of imparting the ink composition onto a recording medium.

The ink jet recording apparatus used for the image forming method of the present invention is not particularly limited, and a known ink jet recording apparatus that can achieve target resolution can be randomly selected and used. That is, as long as the apparatus is a known ink jet recording apparatus including commercially available products, the ink composition can be discharged to a recording medium in the image forming method of the present invention.

Examples of the ink jet recording apparatus usable in the present invention include an apparatus having an ink supplying system, a temperature sensor, and heating means.

The ink supplying system includes, for example, a main tank containing the ink composition of the present invention, supply piping, an ink supplying tank placed immediately before an ink jet head, a filter, and a piezo-type ink jet head. The piezo-type ink jet head can be driven so as to be able to discharge multisize dots of preferably 1 pl to 100 pl and more preferably 8 pl to 30 pl, with a resolution of preferably 320×320 dpi to 4,000×4,000 dpi, more preferably 400×400 dpi to 1,600×1,600 dpi, and even more preferably 720×720 dpi. In addition, "dpi" described in the present invention refers to the number of dots per 2.54 cm (1 inch).

It is desirable for the temperature of the discharged ink composition of the present invention to be constant. Therefore, the ink jet recording apparatus preferably includes means for stabilizing the temperature of ink composition. The portion to be kept at a constant temperature includes the piping system from the ink tank (intermediate tank when there is an intermediate tank) to the ejection surface of the nozzle and all members. That is, from the ink supplying tank to the portion of the ink jet head can be insulated and heated.

The method of controlling temperature is not particularly limited. However, for example, it is preferable to provide plural temperature sensors to the respective portions in the piping so as to control heating according to the flow rate of the ink composition and environmental temperature. The temperature sensors can be arranged near the nozzle of the ink supplying tank and the ink jet head. Moreover, the head unit to be heated is preferably thermally blocked or insulated such that the body of the apparatus is not influenced by the temperature of the outside air. In order to shorten a rise time of a printer required for heating, or to reduce the loss of heat energy, it is preferable to insulate the heat unit from other portions and reducing thermal capacity of the whole heating unit.

The ink composition is discharged using the above ink jet recording apparatus, preferably after the ink composition is heated to 25° C. to 60° C. more preferably to 25° C. to 50° C., and the viscosity of the ink composition is decreased preferably to 3 mPa·s to 20 mPa·s and more preferably 3 mPa·s to 15 mPa·s. Particularly, it is preferable to use an ink composition having a viscosity at 25° C. of 40 mPa·s or less as the ink composition of the present invention, since such an ink composition can be discharged excellently. By using the method, a high degree of discharge stability can be realized.

When the ink composition is discharged, the temperature thereof is preferably constant. A control width of the temperature of the ink composition is set appropriately such that the width is preferably ±5° C. of a preset temperature, more preferably ±2° C. of a preset temperature, and most preferably ±1° C. of a preset temperature.

In the present invention, a recording medium is not particularly limited, and a recording medium known as a support or a recording material can be used. Examples of the recording medium include paper, paper laminated with plastic (for example, polyethylene, polypropylene, and polystyrene), a metal plate (for example, aluminum, zinc, and copper), a plastic film (for example, a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal), paper or a plastic film onto which the above metal is laminated or vapor-deposited, and the like. Among these, as the recording medium, plastic substrates such as polyvinyl chloride, polyethylene terephthalate, and polyethylene are preferable, polyvinyl chloride resin substrates are more preferable, and sheets or films of a polyvinyl chloride resin are even more preferable, since the ink composition of the present invention can be suitably used on a non-absorbing recording medium as the recording medium due to the excellent adhesiveness of the ink composition of the present invention.

(Ink Drying Step)

The ink drying step is a step of reducing the amount of the (b) aqueous medium containing water in the ink composition imparted as above. In this step, the amount of the (c) water-soluble organic solvent that is contained in the ink composition as desired is also reduced together with water, whereby an ink image is fixed onto the recording medium.

In the ink drying step, the image is preferably fixed in the manner in which the (b) aqueous medium containing water is evaporated and the amount thereof is reduced by heating means.

The ink drying step for drying and fixing the discharged ink composition of the present invention will be described.

The heating means is not particularly limited as long as it can evaporate water and the water-soluble organic solvent that is concurrently used if necessary, and known heating means can be appropriately used according to purposes. Examples of usable heating means include a platen heater, a heat drum, hot air, an infrared heater, an infrared lamp, a heating oven, heat plate heating, and the like. Among these, a method of drying a substrate by heating the substrate from its back surface by using a platen heater, or a method of drying the substrate from the front surface by using an infrared heater or hot air is preferable. Using these methods in combination is also preferable.

The heating temperature is not particularly limited, as long as the (b) aqueous medium containing water present in the ink composition, that is, water contained in the aqueous medium or the water-soluble organic solvent concurrently used if necessary is evaporated and the amount thereof is reduced, and a film of the (a) specific copolymer can be formed at the temperature. However, drying is preferably performed under a mild heating atmosphere at a temperature equal to or lower than 60° C., since the ink composition containing the (a) specific copolymer and the (b) aqueous medium can more rapidly form a smooth film by the reduction in the amount of the (b) aqueous medium. Herein, the "atmosphere at a temperature equal to or lower than 60° C." means that the surface temperature of a substrate is 60° C. or lower.

Effects of heating are obtained when the heating temperature is (atmospheric temperature) is 30° C. or higher, and the heating temperature preferably ranges from 40° C. to 60° C. According to the drying step performed under an atmosphere at a temperature equal to or lower than 60° C., which is a preferable embodiment of the image forming method of the present invention, there is an advantage that heating can be performed with small energy, and deformation or damage resulting from heat is not easily caused even when a recording medium having low thermal resistance is used.

In addition, when a recording medium having thermal resistance, such as paper or a metal film is used, an image formed of the ink composition of the present invention can be dried at a higher temperature. In this case, heating can be performed in an atmosphere at a temperature of about 40° C. to 150° C., and the ink drying step may be performed in a temperature range of about from 40° C. to 80° C.

Further, the drying/heating time is not particularly limited, as long as the (b) aqueous medium containing water present in the ink composition can be evaporated, and a film containing the (a) specific copolymer can be formed in this time. The drying/heating time can be appropriately set in consideration of the makeup and a printing speed of the ink composition to be used.

<Printed Article>

The printed article of the present invention has an image formed of the ink composition of the present invention or an image formed of an ink composition that is recorded by the image forming method of the present invention, on a recording medium.

The printed article of the present invention is a printed article having an image recorded using the ink composition of the present invention. Accordingly, the printed article becomes a printed article having an image in which bleeding caused during drop landing is inhibited and which shows excellent toughness, glossiness, and adhesiveness with respect to a substrate.

EXAMPLES

Hereinafter, the present invention will be described in detail based on examples, but the present invention is not limited to those examples. In addition, unless otherwise specified, "part(s)" and "%" are based on mass.

Details of the pigment dispersions and ink compositions used in examples and comparative examples will be shown below.

Preparation of Dispersion of Resin-Coated Pigment

Synthesis Example 1

Synthesis of Polymer Dispersant E-1

44 g of methyl ethyl ketone was put in a 500 ml three-neck flask including a stirrer and a condenser and heated at 72° C. under a nitrogen atmosphere, and a solution obtained by dissolving 0.43 g of dimethyl 2,2'-azobisisobutyrate, 30 g of benzyl methacrylate, 5 g of methacrylic acid, and 15 g of methyl methacrylate in 25 g of methyl ethyl ketone was added dropwise thereto over 3 hours. After the dropwise addition ended, the solution was reacted for an hour. Thereafter, a solution obtained by dissolving 0.21 g of dimethyl 2,2'-azobisisobutyrate in 1 g of methyl ethyl ketone was added thereto, and the temperature of the resultant was increased to 78° C. to perform heating for 4 hours. The obtained reaction solution was reprecipitated twice in an excess amount of hexane, and the precipitated resin was dried, thereby obtaining 43 g of a polymer dispersant E-1.

The composition of the obtained resin was confirmed by $^1$H-NMR, and the weight average molecular weight (Mw) thereof measured by GPC was 42,000. In addition, the acid value thereof measured by the method described in JIS standard (JISK0070:1992) was 65.4 mg KOH/g.

Synthesis Example 2

Preparation of Dispersion of Resin-Coated Pigment (Resin-Coated Cyan Pigment Dispersion (C))

10 parts of Pigment Blue 15:3 (Phthalocyanine Blue A220 manufactured by Dainichiseika Color & Chemicals Mfg. Co., Ltd.), 5 parts of the polymer dispersant E-1 obtained in the Synthesis example 1, 42 parts of methyl ethyl ketone, 5.5 parts of a 1 mol/L aqueous NaOH solution, and 87.2 parts of deionized water were mixed together, and dispersed for 2 to 6 hours by a beads mill using 0.1 mmφ zirconia beads.

The obtained dispersion was heated at 55° C. under reduced pressure to remove methyl ethyl ketone and a portion of water, thereby obtaining a dispersion of a cyan pigment that was coated with the polymer dispersant E-1 and had a pigment concentration of 10.2% by mass. Hereinafter, the pigment dispersion will be called a "C dispersion".

Synthesis Example 3

Synthesis of Comparative Water-Soluble Copolymer (B-1)

10.0 g of 2-butanone (manufactured by Wako Pure Chemical Industries, Ltd.) was put in a 200 mL three-neck flask including a stirring blade, and then stirred under heating for 10 minutes in an oil bath at 80° C. under a nitrogen atmosphere. Subsequently, a mixed solution of 24 g of n-butyl methacrylate (manufactured by Wako Pure Chemical Industries, Ltd.), 6.0 g of methacrylic acid (manufactured by Wako Pure Chemical Industries, Ltd.), 0.1 g of 6-mercaptohexanol (Sigma-Aldrich Co. LLC, Japan), 80 mg of dimethyl 2,2'-azobis(isobutyrate) (Wako Pure Chemical Industries, Ltd.), 30 g of 2-butanone, and 5 g of 2-propanol (Wako Pure Chemical Industries, Ltd.) was added dropwise for 3 hours to 2-butanone which was being heated under stirring in the flask. The solution was further stirred for 3 hours, and then 46 mg of dimethyl 2,2'-azobis(isobutyrate) was added thereto, followed by stirring with heating under reflux for 3 hours.

100 g of acetone was added to the obtained polymer solution, and then the resultant was reprecipitated in 3 L of n-hexane. The formed precipitate was separated by filtration and then dried in a vacuum, thereby obtaining 28 g of a white solid (polymer). 20.0 g of 2-pyrrolidone, 1.46 g of sodium hydrogen carbonate, and 18 g of water were added to 10.0 g of the obtained polymer, and the polymer was dissolved by being stirred for 30 minutes at 80° C. Water was added thereto, thereby obtaining a 20% solution of a water-soluble polymer B-1 having the following structure.

The weight average molecular weight of the polymer measured by GPC described above was 50,000. In addition, the SP value and acid value thereof measured by the method described above are shown below. The comparative water-soluble polymer is a comparative copolymer of which the acid value is out of the range of the present invention as shown below.

The abbreviations of the monomers described in Table 1 represent the following.

EHMA: 2-ethylhexyl methacrylate (manufactured by Wako Pure Chemical Industries, Ltd.)

BMA: n-butyl methacrylate (manufactured by Wako Pure Chemical Industries, Ltd.)

HMA: hexyl methacrylate (manufactured by TOKYO CHEMICAL INDUSTRY CO., LTD.)

MMA: methyl methacrylate (manufactured by Wako Pure Chemical Industries, Ltd.)

MAA: methacrylic acid (manufactured by Wako Pure Chemical Industries, Ltd.)

HEMA: 2-hydroxyethyl methacrylate (Sigma-Aldrich Co., LLC, Japan)

BnMA: benzyl methacrylate (manufactured by Wako Pure Chemical Industries, Ltd.)

[Chem. 3]

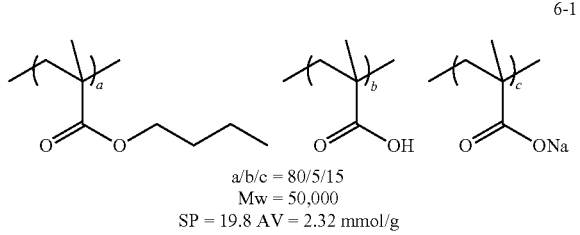

6-1 a/b/c = 80/5/15
Mw = 50,000
SP = 19.8 AV = 2.32 mmol/g

Synthesis examples 4 to 9

Synthesis of (a) Specific Copolymers (A-1) to (A-6) and Comparative Water-Soluble Copolymers (B-2) and (B-3)

20% solutions of the (a) specific copolymers (A-1) to (A-6) and the comparative water-soluble copolymers (B-2) and (B-3) were prepared by the same operation as in the synthesis of the comparative water-soluble copolymer (B-1), by using monomers described in the following Table 1 as raw materials and appropriately changing the amount of 6-mercaptohexanol, dimethyl 2,2'-azobis(isobutyrate), and sodium hydrogen carbonate added.

The repeating units contained in the respective copolymers obtained in Synthesis examples 4 to 9, the content ratio thereof (base on mass), the weight average molecular weight, the SP value, and the acid value are shown below.

[Chem. 4]

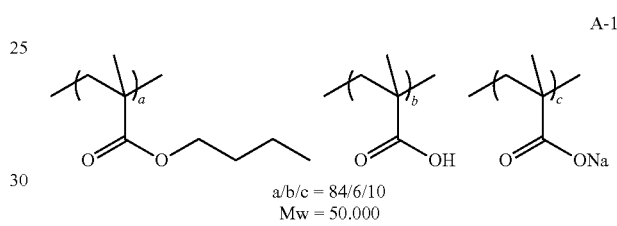

A-1 a/b/c = 84/6/10
Mw = 50.000
SP = 19.2 AV = 1.86 mmol/g

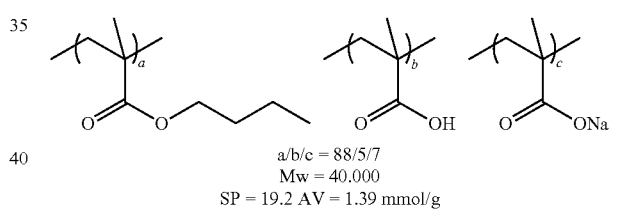

A-2 a/b/c = 88/5/7
Mw = 40.000
SP = 19.2 AV = 1.39 mmol/g

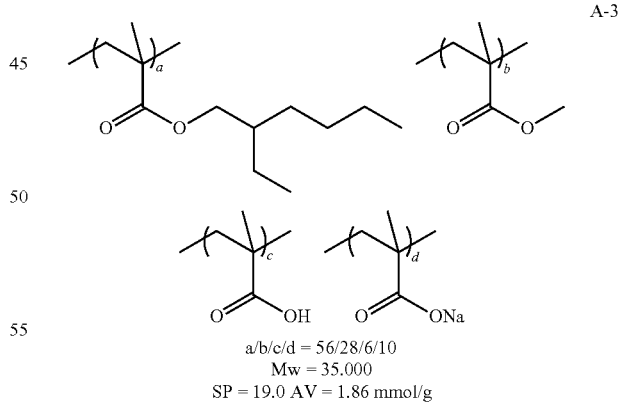

A-3 a/b/c/d = 56/28/6/10
Mw = 35.000
SP = 19.0 AV = 1.86 mmol/g

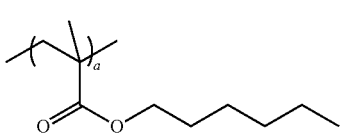

A-4

TABLE 1

| (a) Specific copolymer | Monomer 1 | | Monomer 2 | | Monomer 3 | |
|---|---|---|---|---|---|---|
| | Type | Used amount (g) | Type | Used amount (g) | Type | Used amount (g) |
| A-1 | BMA | 25.2 | MAA | 4.8 | — | — |
| A-2 | BMA | 26.4 | MAA | 3.6 | — | — |
| A-3 | EHMA | 16.8 | MMA | 8.4 | MAA | 4.8 |
| A-4 | HMA | 12 | BnMA | 13.2 | MAA | 4.8 |
| A-5 | HEMA | 9 | EHMA | 16.2 | MAA | 4.8 |
| A-6 | BMA | 4.2 | BnMA | 16.2 | MAA | 4.8 |

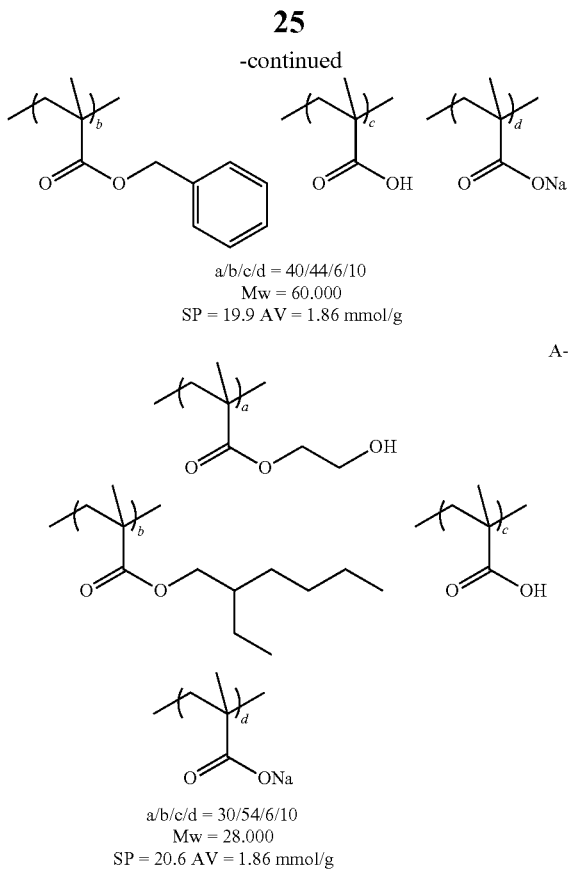

A-5

A-6

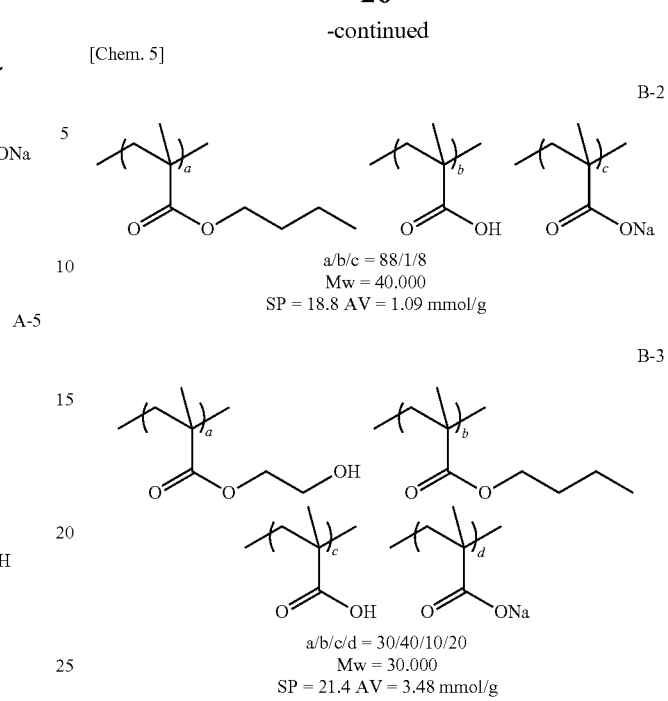

B-2 a/b/c = 88/1/8
Mw = 40.000
SP = 18.8 AV = 1.09 mmol/g

B-3

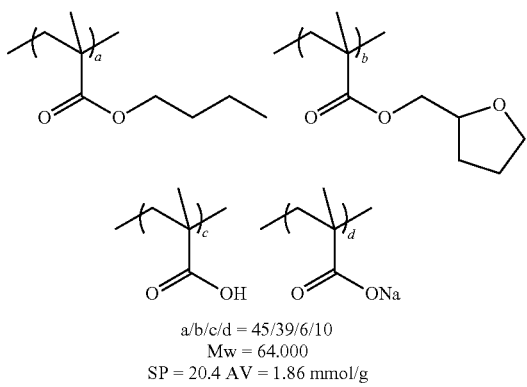

a/b/c/d = 30/40/10/20
Mw = 30.000
SP = 21.4 AV = 3.48 mmol/g

<Preparation of Ink Composition>

The obtained dispersion (C dispersion), (a) specific copolymer, water and the (c) water-soluble organic solvent contained in the (b) aqueous medium containing water, and other raw materials were mixed and stirred at 500 rpm by using a mixer (L4R manufactured by Silverson) so as to form the composition shown in the following Table 2, thereby obtaining dispersion compositions. Each of the compositions was filled in a disposable plastic syringe and filtered through a polyvinylidene fluoride (PVDF) filter having a pore size of 5 μm (Millex-SV manufactured by Millipore Corporation, diameter 25 mm), thereby obtaining ink compositions of Examples 1 to 12 and Comparative Examples 1 to 3.

In addition, as the (c) water-soluble organic solvent, 2-pyrrolidone (manufactured by Sigma-Aldrich Co., LLC, Japan) and 2-methyl-1,3-propanediol (described as "MDP" in the table, manufactured by TOKYO CHEMICAL INDUSTRY CO., LTD.) were used, as a surfactant, ZONYL FSN (fluorosurfactant, manufactured by Sigma-Aldrich Co., LLC.) was used, and as water, deionized water was used. The viscosity of the ink composition ranged from 4 mPa·s to 20 mPa·s at room temperature.

TABLE 2

| | (a) Specific copolymer or comparative copolymer | (b) Aqueous medium containing water | | | (d) Pigment dispersion (cyan) | Surfactant (FSN) | Ink evaluation | | | |
|---|---|---|---|---|---|---|---|---|---|---|
| | | Water | (c) Water-soluble organic solvent | | | | | | | |
| | | | 2-Pyrrolidone | MPD | | | | | | |
| | Used | Used | Used | Used | Used | Used | | | | |
| | Abbreviation | amount (g) | amount (g) | amount (g) | amount (g) | amount (g) | amount (g) | Water resistance | Adhesiveness | Glossiness | bleeding |
| Example 1 | A-1 | 3 | 76 | 20 | 0 | 20 | 1 | B | A | B | B |
| Example 2 | A-1 | 5 | 74 | 20 | 0 | 20 | 1 | A | A | B | B |
| Example 3 | A-1 | 10 | 69 | 20 | 0 | 20 | 1 | A | A | A | A |
| Example 4 | A-1 | 10 | 69 | 30 | 0 | 20 | 1 | A | A | A | A |
| Example 5 | A-1 | 15 | 64 | 20 | 0 | 20 | 1 | A | B | A | A |
| Example 6 | A-1 | 10 | 64 | 20 | 5 | 20 | 1 | A | A | A | A |

TABLE 2-continued

| | (a) Specific copolymer or comparative copolymer | | (b) Aqueous medium containing water | | | (d) Pigment dispersion (cyan) | Surfactant (FSN) | Ink evaluation | | | |
|---|---|---|---|---|---|---|---|---|---|---|---|
| | | | Water | (c) Water-soluble organic solvent | | | | | | | |
| | | | | 2-Pyrrolidone | MPD | | | | | | |
| | | Used | Used | Used | Used | Used | Used | | | | |
| | Abbreviation | amount (g) | amount (g) | amount (g) | amount (g) | amount (g) | amount (g) | Water resistance | Adhesiveness | Glossiness | bleeding |
| Example 7 | A-1 | 10 | 59 | 20 | 10 | 20 | 1 | A | B | A | A |
| Example 8 | A-2 | 10 | 64 | 20 | 5 | 20 | 1 | A | A | A | A |
| Example 9 | A-3 | 10 | 64 | 20 | 5 | 20 | 1 | A | A | A | A |
| Example 10 | A-4 | 10 | 64 | 20 | 5 | 20 | 1 | A | B | A | A |
| Example 11 | A-5 | 10 | 64 | 20 | 5 | 20 | 1 | B | A | A | A |
| Example 12 | A-6 | 10 | 64 | 20 | 5 | 20 | 1 | A | A | A | A |
| Comparative Example 1 | B-1 | 10 | 69 | 20 | 0 | 20 | 1 | C | C | A | C |
| Comparative Example 2 | B-2 | 10 | 69 | 20 | 0 | 20 | 1 | A | A | C | C |
| Comparative Example 3 | B-3 | 10 | 69 | 20 | 0 | 20 | 1 | C | C | C | C |

<Evaluation of Ink Composition>

The obtained ink was coated at a thickness of 12 μm onto a vinyl chloride sheet 8 cm square (manufactured by Avery Dennison Corporation, AVERY 400 GLOSS WHITE PERMANENT) by using a No. 2 bar of K hand coater manufactured by PK PRINT COAT INSTRUMENTS. The resultant was dried for 3 minutes at 60° C. to remove moisture.

The following evaluation was performed using the obtained printed article. The evaluation results are shown in the above Table 2.

<Water Resistance Evaluation>

As one of indices of the toughness of an ink image, water resistance was evaluated.

The surface of an ink image of the printed article was scraped 10 times with a cotton swab dampened with water, and peeling of the image was visually observed and evaluated by the following criteria A: peeling or a trace of scraping is not observed at all in the image.
B: A slight trace of scraping is observed in the image, but this is a practically unproblematic state.
C: Traces of scraping are markedly observed in the image, or peeling is caused in the image.

<Bleeding Property Evaluation>

As an ink jet recording apparatus, a commercially available ink jet printer (manufactured by FUJIFILM Dimatix, DMP-2831) was prepared. The obtained respective ink compositions were filled in the ink jet printer, and fine lines having a width of 2 dots were recorded at a length of 5 cm in a polyvinyl chloride substrate (manufactured by Avery Denisson Corporation, AVERY 400 GLOSS WHITE PERMANENT) heated at 40° C. After discharge was stopped, bleeding of the obtained fine lines were visually evaluated.

A: there is practically no bleeding, and fine lines are in a state of straight lines.
B: there is slight bleeding, and fine lines are practically straight, which is a practically unproblematic state.
C: bleeding is marked, a portion of the fine lines becomes thick, which is a practically problematic state.

<Evaluation of Substrate Adhesiveness>

As a method of evaluating adhesiveness with respect to a polyvinyl chloride substrate, a cross hatch test (JIS K5600-5-6, 2004) was conducted. According to the ink jet recording method applied to the bleeding evaluation, a solid image in which an average film thickness of an image portion was 12 μm was drawn. Thereafter, a cross hatch test was performed on each printed article. In addition, the adhesiveness was classified into 6 levels including level 0 to level 5 according to JIS K5600-5-6 (2004) and evaluated based on the following criteria. Herein, an evaluation class 0 means that the cut edge is perfectly smooth and peeling is not caused in any cell of a lattice.

When a lattice-like cut was made, the cut was made in an image portion into the depth reaching the substrate to evaluate the adhesiveness between the ink and the substrate. If the adhesiveness corresponds to A or B of the following evaluation criteria, this is practically unproblematic.

A: JIS K5600-5-6 class 0 or 1
B: JIS K5600-5-6 class 2 or 3
C: JIS K5600-5-6 class 4 or 5

<Glossiness Evaluation>

The glossiness of an image was evaluated by measuring a degree of glossiness under the following conditions.

Based on JIS Z8741, the solid image used for the above adhesiveness test was measured at a measurement angle of 60° by using a gloss meter manufactured by Sheen Instruments. A grade of evaluation was given according to the following criteria.

A. a degree of glossiness of 50 or higher
B: a degree of glossiness of 20 or higher and lower than 50
C: a degree of glossiness of lower than 20

A level that is equal to or higher than B in the evaluation is practically acceptable.

<Lightfastness Evaluation>

In addition to the above respective evaluations, as one of the indices of toughness of an ink image, lightfastness was evaluated under the following conditions.

The vinyl chloride sheet on which the image was formed of the ink composition of Examples 1 to 12 was irradiated with a xenon lamp (100,000 1x) for 7 days by using a weather meter (Atlas C.165 manufactured by Atlas). The image densities before and after the xenon lamp irradiation was measured using a reflection densitometer (X-Rite 310TR manufactured by X-Rite Company) to evaluate the lightfastness by using a residual ratio of a dye. As a result, it was confirmed that all of the images formed of the ink compositions of Examples 1 to 12 showed an excellent residual ratio of a dye that was equal to or higher than 80%.

The results of Table 2 clearly showed that the ink compositions of Examples 1 to 12 according to the present invention formed a highly fine image by the ink jet method without showing bleeding resulting from the interference of ink drops dropped by an inkjet method, and formed an image showing excellent glossiness and adhesiveness with respect to a recording medium even when the ink composition was dried at a low temperature such as 60° C. Moreover, it was confirmed that the ink image had excellent lightfastness. On the other hand, the ink composition of Comparative Example 1 using the comparative copolymer (B-1) which had an acid value higher than the range of the present invention also containing the same repeating unit as that of the (a) specific copolymer (A-1) was poor in terms of water resistance of the image, adhesiveness with respect to a substrate, and the bleeding inhibition effect. With the ink of Comparative Example 2 which used the comparative copolymer (B-2) having an acid value lower than the range of the present invention, the water resistance of the image and adhesiveness with respect to a substrate were expressed, but the ink was poor in terms of glossiness and the bleeding inhibition effect. In addition, the ink composition of Comparative Example 3 using the Comparative copolymer (B-3) of which both the acid value and the SP value were outside the range of the present invention was poor in terms of all evaluations.

This application claims priority under 35 U.S.C. §119 of Japanese Patent application JP 2012-028758, filed on Feb. 13, 2012, the entire contents of which are hereby incorporated by reference.

What is claimed is:

1. An ink composition for an ink jet comprising:
    (a) an alkyl (meth)acrylate copolymer which contains a repeating unit derived from an alkyl (meth)acrylate having 7 to 22 carbon atoms in total and a repeating unit derived from (meth)acrylic acid and has an acid value of 1.3 mmol/g to 2.0 mmol/g in an unneutralized state; and
    (b) an aqueous medium containing water, wherein
    the (a) alkyl (meth)acrylate copolymer is a copolymer of which 10% by mass or more dissolves in the (b) aqueous medium used in the ink composition.
2. The ink composition for an ink jet according to claim 1, wherein the (a) alkyl (meth)acrylate copolymer is a neutralized material in which at least a portion thereof has been neutralized and which has a neutralization degree of 40% to 100%.
3. The ink composition for an ink jet according to claim 1, wherein an SP value of the (a) alkyl (meth)acrylate copolymer in an unneutralized state is 18.5 $MPa^{1/2}$ to 20.5 $MPa^{1/2}$.
4. The ink composition for an ink jet according to claim 2, wherein an SP value of the (a) alkyl (meth)acrylate copolymer in an unneutralized state is 18.5 $MPa^{1/2}$ to 20.5 $MPa^{1/2}$.
5. The ink composition for an ink jet according to claim 1, wherein a proportion of the (a) alkyl (meth)acrylate copolymer added to the ink composition is 5% by mass to 15% by mass.
6. The ink composition for an ink jet according to claim 4, wherein a proportion of the (a) alkyl (meth)acrylate copolymer added to the ink composition is 5% by mass to 15% by mass.
7. The ink composition for an ink jet according to claim 1, wherein the (a) alkyl (meth)acrylate copolymer is a copolymer that contains only a repeating unit derived from an alkyl (meth)acrylate having 7 to 20 carbon atoms in total and the repeating unit derived from (meth)acrylic acid as repeating units.
8. The ink composition for an ink jet according to claim 1, wherein the (a) alkyl (meth)acrylate copolymer is a copolymer that contains only a repeating unit derived from an alkyl methacrylate having 7 to 20 carbon atoms in total and a repeating unit derived from methacrylic acid as repeating units.
9. The ink composition for an ink jet according to claim 1, wherein the (b) aqueous medium containing water contains (c) a water-soluble organic solvent.
10. The ink composition for an ink jet according to claim 6, wherein the (b) aqueous medium containing water contains (c) a water-soluble organic solvent.
11. The ink composition for an ink jet according to claim 1, further comprising (d) a colorant.
12. An image forming method comprising an ink imparting step for imparting the ink composition according to claim 1 onto a recording medium.
13. An image forming method comprising:
    an ink-imparting step for imparting the ink composition according to claim 1 onto a recording medium; and
    an ink drying step for drying the ink composition imparted onto the recording medium to remove at least a portion of the (b) aqueous medium containing water that is contained in the ink composition.
14. The image forming method according to claim 13, wherein the ink drying step is performed in an atmosphere at a temperature equal to or lower than 60° C.
15. A printed article which is formed on an image recording medium by the ink composition according to claim 1.
16. A printed article which is formed on an image recording medium by the image forming method according to claim 12.
17. The ink composition for an ink jet according to claim 1, wherein the alkyl (meth)acrylate having 7 to 22 carbon atoms in total is contained in the (a) alkyl (meth)acrylate copolymer in an amount of 56% by mass to 90.7% by mass, and the alkyl chain of the alkyl (meth)acrylate having 7 to 22 carbon atoms in total is linear or branched.

* * * * *